(12) United States Patent
Kawamura et al.

(10) Patent No.: US 11,498,634 B2
(45) Date of Patent: Nov. 15, 2022

(54) STRADDLE TYPE VEHICLE

(71) Applicant: HONDA MOTOR CO., LTD., Tokyo (JP)

(72) Inventors: Akihito Kawamura, Wako (JP); Futoshi Koga, Wako (JP); Hiroshi Maeda, Wako (JP); Yoshiyuki Kuroba, Wako (JP); Naoto Yamashita, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 58 days.

(21) Appl. No.: 17/096,298

(22) Filed: Nov. 12, 2020

(65) Prior Publication Data
US 2021/0061389 A1 Mar. 4, 2021

Related U.S. Application Data

(63) Continuation of application No. PCT/JP2018/019895, filed on May 23, 2018.

(51) Int. Cl.
*B62J 6/027* (2020.01)
*B62J 6/026* (2020.01)
*B62J 45/41* (2020.01)
*B62J 45/42* (2020.01)
*B62J 6/022* (2020.01)

(52) U.S. Cl.
CPC ............ *B62J 6/027* (2020.02); *B62J 6/022* (2020.02); *B62J 6/026* (2020.02); *B62J 45/41* (2020.02); *B62J 45/42* (2020.02)

(58) Field of Classification Search
CPC ... B62J 45/41; B62J 45/42; B62J 6/022; B62J 6/026; B62J 6/027; F21W 2107/17
See application file for complete search history.

(56) References Cited

U.S. PATENT DOCUMENTS

| 6,483,467 | B2 | 11/2002 | Kushida et al. |
| 8,689,923 | B2 | 4/2014 | Kishikawa |
| 9,346,507 | B2 * | 5/2016 | Hoashi ............... B62J 6/027 |
| 10,054,455 | B2 | 8/2018 | Asakura et al. |

(Continued)

FOREIGN PATENT DOCUMENTS

| JP | S54-41055 U | 3/1979 |
| JP | S60-146770 A | 8/1985 |

(Continued)

OTHER PUBLICATIONS

English Machine Translation of JP 2014210443 provided by Espacenet (Year: 2014).*

(Continued)

*Primary Examiner* — Zheng Song
(74) *Attorney, Agent, or Firm* — Thomas | Horstemeyer, LLP

(57) ABSTRACT

A straddle type vehicle comprising a vehicle body frame including a head pipe and a main frame extending from the head pipe to a rear side, and a headlight unit provided on a front side of the vehicle body frame, and further comprising a support stay fixed to the vehicle body frame to support a predetermined vehicle constituent component on the front side of the vehicle body frame, and a driving support sensor fixed to the support stay on a lower side of the headlight unit.

6 Claims, 4 Drawing Sheets

(56) References Cited

U.S. PATENT DOCUMENTS

| | | | |
|---|---|---|---|
| 2002/0003501 A1 | 1/2002 | Kushida et al. | |
| 2007/0086203 A1* | 4/2007 | Nakano | B62J 6/023 |
| | | | 362/514 |
| 2013/0020143 A1 | 1/2013 | Kishikawa | |
| 2013/0241414 A1* | 9/2013 | Ikeda | B60Q 1/18 |
| | | | 315/82 |
| 2015/0329072 A1* | 11/2015 | Freienstein | G01S 13/86 |
| | | | 701/49 |
| 2016/0241816 A1 | 8/2016 | Noguchi et al. | |
| 2017/0010612 A1 | 1/2017 | Asakura et al. | |
| 2021/0203063 A1* | 7/2021 | Kuroba | B62J 99/00 |
| 2021/0284268 A1* | 9/2021 | Aikyo | B62J 45/414 |

FOREIGN PATENT DOCUMENTS

| | | | | |
|---|---|---|---|---|
| JP | 2001-352209 A | | 12/2001 | |
| JP | 2008-80867 A | | 4/2008 | |
| JP | 2008080867 | * | 4/2008 | ........... B60Q 1/0017 |
| JP | 2012-176755 A | | 9/2012 | |
| JP | 2013023121 A | | 2/2013 | |
| JP | 2014-65464 A | | 4/2014 | |
| JP | 2014210443 | * | 11/2014 | ........... B60Q 1/0094 |
| JP | 2016-16773 A | | 2/2016 | |
| JP | 2016-68769 A | | 5/2016 | |
| JP | 2017-019308 A | | 1/2017 | |
| JP | 2017039487 | * | 2/2017 | .............. B62J 99/00 |
| WO | 2015/049792 A1 | | 4/2015 | |
| WO | 2019/224957 A1 | | 11/2019 | |

OTHER PUBLICATIONS

International Search Report and Written Opinion for PCT/JP2018/019895 dated Aug. 7, 2018.

Indian Office Action for Indian Patent Application No. 202017049986 dated Mar. 26, 2021.

* cited by examiner

STRADDLE TYPE VEHICLE

CROSS-REFERENCE TO RELATED APPLICATION(S)

This application claims priority to and the benefit of Japanese Patent Application No. PCT/JP2018/019895 filed on May 23, 2018, the entire disclosure of which is incorporated herein by reference.

TECHNICAL FIELD

The present invention relates to a straddle type vehicle, and mainly, to a vehicle body front structure thereof.

BACKGROUND ART

As an example of a four-wheeled vehicle, a vehicle capable of performing some or all of driving operations such as acceleration and braking on the side of an ECU (Electronic Control Unit), that is, performing driving support has been proposed (PTL 1). According to PTL 1, a plurality of driving support sensors, for example, cameras, radars, and the like are arranged around a vehicle body, and the driving support is implemented based on the detection results of the traveling environment of the four-wheeled vehicle by the driving support sensors.

CITATION LIST

Patent Literature

PTL 1: Japanese Patent Laid-Open No. 2017-19308
PTL 2: Japanese Patent Laid-Open No. 2012-176755

SUMMARY OF INVENTION

Technical Problem

In general, it is difficult for a straddle type vehicle such as a motorcycle to ensure a space to arrange vehicle constituent components (see PTL 2). For this reason, to apply an arrangement capable of driving support to a straddle type vehicle, how to install driving support sensors in the straddle type vehicle needs to be taken into consideration.

It is an object of the present invention to implement installation of a driving support sensor in a straddle type vehicle by a relatively simple arrangement.

Solution to Problem

An aspect of the present invention is related to a straddle type vehicle, comprising a vehicle body frame including a head pipe and a main frame extending from the head pipe to a rear side, a headlight unit provided on a front side of the vehicle body frame, a support stay fixed to the vehicle body frame to support a predetermined vehicle constituent component on the front side of the vehicle body frame, and a driving support sensor fixed to the support stay on a lower side of the headlight unit, wherein, in a front view, a depressed portion that is depressed to an upper side is provided on a lower edge portion of a housing of the headlight unit, and the driving support sensor is fixed such that at least an upper portion is stored in the depressed portion.

Advantageous Effects of Invention

According to the present invention, it is possible to appropriately install a driving support sensor in a straddle type vehicle.

DESCRIPTION OF EMBODIMENTS

Figure 1:
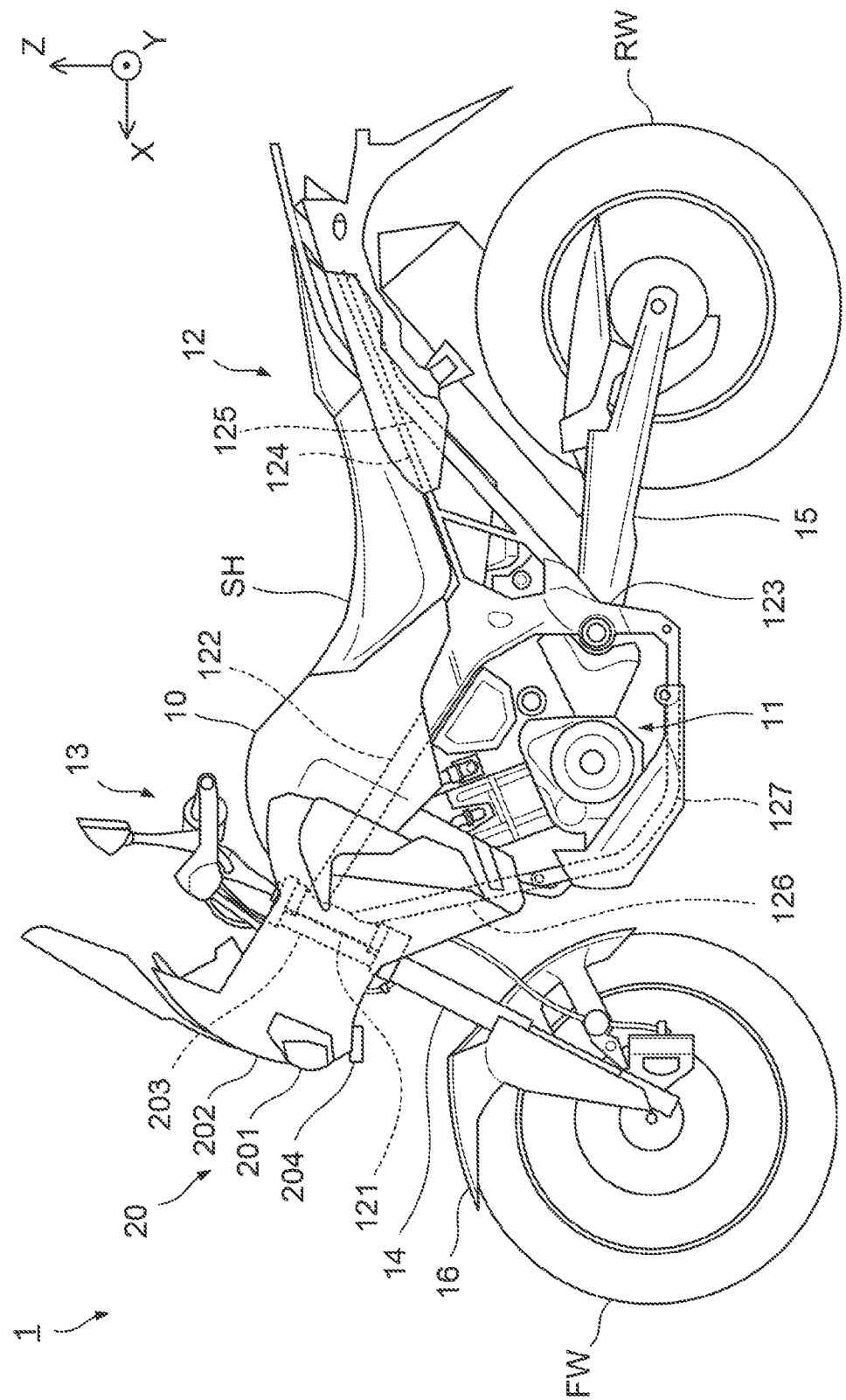
FIG. 1 is a right side view for explaining an example of the arrangement of a straddle type vehicle according to the embodiment.

Embodiments of the present invention will now be described with reference to the accompanying drawings. Note that the drawings are schematic views showing structures or arrangements according to the embodiments, and the dimensions of members shown in the drawings do not necessarily reflect the actuality. In the drawings, the same reference numerals denote the same members or the same constituent elements, and a description of repetitive contents will be omitted hereinafter.

FIG. 1 is a right side view showing an example of the structure of a straddle type vehicle 1 according to the embodiment. For easy understanding of the structure, FIG. 1 shows an X-axis, a Y-axis, and a Z-axis, which are orthogonal to each other (this also applies to other drawings to be described later). The X direction corresponds to the front-and-rear direction of the vehicle body, the Y direction corresponds to the vehicle width direction or the left-and-right direction of the vehicle body, and the Z direction corresponds to the vertical direction of the vehicle body. In this specification, expressions "front/rear", "left/right (lateral)". "upper/lower", and the like represent relative positional relationships with respect to the vehicle body. For example, expressions "front", "front side" and the like correspond to the +X direction, and expressions "rear", "rear side" and the like correspond to the −X direction.

The straddle type vehicle 1 is a type of vehicle that a rider (driver) drives while straddling a vehicle body 10 and, in this embodiment, is a motorcycle including a seat SH on which the rider can sit, a front wheel FW, and a rear wheel RW. The straddle type vehicle 1 further includes a power unit 11, a vehicle body frame 12, an operation mechanism 13, a front fork 14, and a swing arm 15. The power unit 11 generates power (rotation) to drive the rear wheel RW that is a driving wheel in this embodiment. As an example of the power unit 11, an internal combustion engine (engine) is used. As another example, an electric motor such as a 3-phase induction motor may be used. The straddle type vehicle 1 can further comprise a transmission configured to shift the power of the power unit 11, although a detailed description thereof will be omitted here.

The vehicle body frame 12 includes ahead pipe 121, a main frame 122, a pivot frame 123, a seat frame 124, a rear frame 125, a down frame 126, and a lower frame 127. The head pipe 121 pivotally supports a handlebar on which the operation mechanism 13 including a brake lever, a turn signal switch, and the like is provided. A pair of left and right front forks 14 are provided to rotatably support the front wheel FW. The rider makes the handle bar pivot, thereby changing the direction of the front wheel FW via the front forks 14 and performing a steering operation.

The main frame 122 is extended from the head pipe 121 to the rear side of the vehicle body. The pivot frame 123 is extended from the rear portion of the main frame 122 to the lower side of the vehicle body. The swing arm 15 rotatably supports the rear wheel RW, and is swingably supported by the pivot frame 123.

The seat frame 124 is extended from the rear portion of the main frame 122 to the rear side of the vehicle body to support a load applied to the seat SH. The rear frame 125 is extended from the pivot frame 123 to the rear side of the vehicle body to support a load applied to the seat SH together with the seat frame 124. Note that a predetermined reinforcing member (truss frame) may be disposed across the seat frame 124 and the rear frame 125 to improve their strength.

In this embodiment, the down frame 126 is extended from the head pipe 121 to the lower rear side. As another embodiment, the down frame 126 may be extended from the upper end portion of the main frame 122 to the lower rear side. Note that a predetermined reinforcing member may be disposed across the main frame 122 and the down frame 126 to improve their strength. The lower frame 127 is extended from the lower portion of the down frame 126 to the rear side (up to the pivot frame 123).

Although not illustrated in FIG. 1 that is a side view, the main frame 122, the pivot frame 123, the seat frame 124, the rear frame 125, the down frame 126, and the lower frame 127 each include a pair to left and right frames. With this arrangement, individual vehicle constituent components in the vehicle body 10 can be fixed to corresponding parts of the above-described vehicle body frame 12 and held in the vehicle body 10. For example, the power unit 11 can be held between the pair of left and right main frames 122 in a planar view (from the viewpoint in the Z direction) and between the main frame 122, the pivot frame 123, the down frame 126, and the lower frame 127 in a side view (from the viewpoint in the Y direction).

The straddle type vehicle 1 further includes a front fender 16 on the upper side of the front wheel FW, as will be described later in detail.

Figure 2:
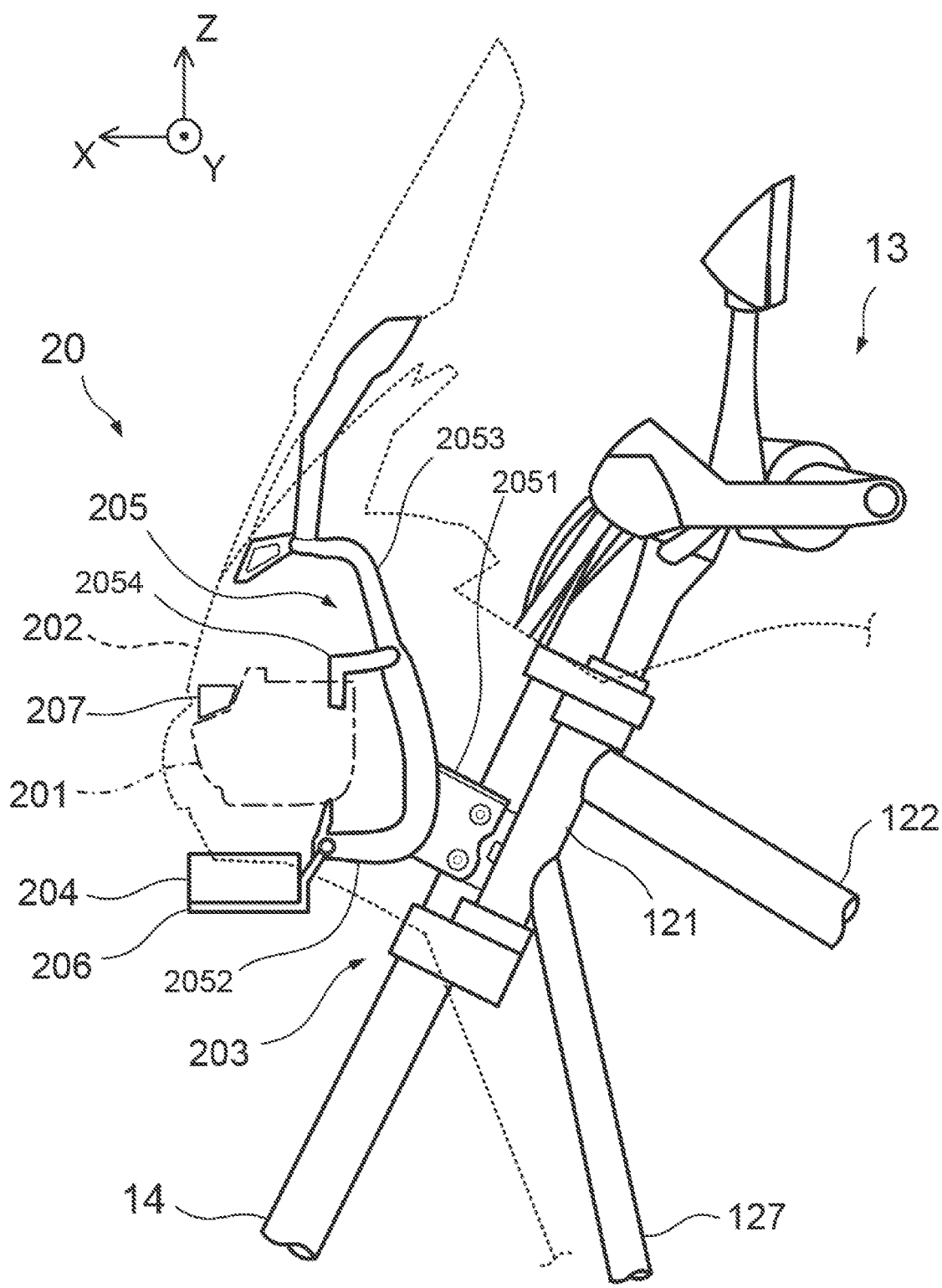
FIG. 2 is a right side view for explaining an example of the internal arrangement of the straddle type vehicle.

FIG. 2 is a schematic view for explaining a vehicle body front structure 20 of the straddle type vehicle 1. In FIG. 2, for easy understanding of the internal arrangement of the vehicle body front structure 20, the outer shape of the vehicle body front structure 20 is indicated by a broken line. The vehicle body front structure 20 includes a headlight unit 201, an upper cowl 202, a steering stem 203, a driving support sensor 204, a support stay 205, an attachment member 206, and an external communication antenna 207.

The headlight unit 201 is a light body that irradiates the front side of the straddle type vehicle 1, and its outer shape is indicated by an alternate long and short dashed line. The headlight unit 201 includes, for example, an LED (Light Emitting Diode) element serving as a light source and an LED driver that drives the LED element, and can also include a reflector and/or a light guide body configured to guide light emitted by the LED element in a desired direction. The headlight unit 201 may simply be referred to as a headlight.

The upper cowl 202 is provided to form the front portion of the exterior panel of the straddle type vehicle 1 and surround the headlight unit 201. The upper cowl 202 can also be referred to as a front cowl, a front cover, or the like.

The steering stem 203 fixes the pair of left and right front forks 14 on both sides of the head pipe 121 by a top bridge on the upper side and a bottom bridge on the lower side. The steering stem 203 is fixed to pivot with respect to the head pipe 121 and, as described above, the rider makes the handle bar of the operation mechanism 13 pivot, thereby changing the direction of the front wheel FW via the front forks 14 and performing a steering operation.

The driving support sensor 204 is a monitoring device or detection device configured to monitor or detect the traveling environment on the front side of the vehicle, and is also called an ADAS (Advanced Driver Assistance System) sensor or the like. Examples of the driving support sensor 204 are a camera (image capturing device) including a CCD image sensor or a CMOS image sensor, and a radar (distance measuring device) such as a millimeter wave radar or a laser radar (so-called LiDAR (Light Detection And Ranging)). In this embodiment, the driving support sensor 204 is arranged on the lower side of the headlight unit 201, as will be described later in detail.

Examples of the traveling environment obtained by the driving support sensor 204 are the presence/absence of a predetermined object such as a pedestrian, another vehicle, or an obstacle on the periphery of the straddle type vehicle 1, and the extending direction of a road to travel. Although a detailed description will be omitted here, the straddle type vehicle 1 further includes an ECU (Electronic Control Unit) including a CPU and a memory, and performs driving support based on the traveling environment obtained by the driving support sensor 204. Driving support means that the ECU performs some or all of driving operations such as acceleration and braking in place of the rider, and examples are vehicle speed maintaining traveling control (adaptive cruise control (ACC)), and lane maintaining traveling control (lane keep assist (LKAS)).

In this embodiment, the support stay 205 is a rod-shaped member having an almost C shape in a side view, and supports the vehicle constituent components of the vehicle body front structure 20. In this embodiment, the support stay 205 supports the headlight unit 201 in the vehicle body front structure 20. In this embodiment, the above-described upper cowl 202 is attached to the headlight unit 201, thereby, for example, improving the attachability of the upper cowl 202 and relatively easily improving the designability of the vehicle body 10.

The support stay 205 includes abase portion 2051, an end portion 2052, an end portion 2053, and an extending portion 2054, and is fixed to the vehicle body frame 12 by the base portion 2051 and fixed to the head pipe 121 in this embodiment. The end portion 2052 is extended from the head pipe 121 to the front side, and the end portion 2053 is extended from the head pipe 121 to the upper side. The vehicle constituent components such as the headlight unit 201 are supported between the two end portions 2052 and 2053. For example, the headlight unit 201 is fixed by fastening by the end portion 2052 and the extending portion 2054 and supported.

The attachment member 206 is a plate-shaped member used to attach the driving support sensor 204 to the support stay 205, and is fixed while extending from the end portion 2052 to the lower front side. The above-described driving support sensor 204 is fixed to the attachment member 206. With this arrangement, the driving support sensor 204 is fixed to the support stay 205 on the lower side of the headlight unit 201.

As described above, the end portion 2052 is extended from the head pipe 121 to the front side. For this reason, the driving support sensor 204 is arranged relatively on the front side of the vehicle body 10, and its direction range (detection range) is not impeded by the headlight unit 201 and the upper cowl 202. Hence, the direction range of the driving support sensor 204 can appropriately be ensured.

Note that the attachment member 206 has a plate shape so as to place and fasten the driving support sensor 204. However, the attachment member 206 may have a rod shape or a tubular shape. The attachment member 206 may be fixed to the end portion 2052 by welding or may be fixed by fastening. The attachment member 206 preferably has a shape capable of functioning as a guard member configured to protect the driving support sensor 204 from stones flown from the lower side.

The external communication antenna 207 is used by the straddle type vehicle 1 to perform external communication such as inter-vehicle communication or vehicle-to-infrastructure communication, and is used to use, for example, a C-ITS (Cooperative Intelligent Transport System). For example, the above-described ECU or another ECU can perform external communication using the external communication antenna 207 and provide traffic congestion information or propose a recommended traveling route to the rider based on the result.

As an example of the external communication antenna 207, an antenna of any variety of shapes such as a pole type or a fin type can be used. To reduce electromagnetic interferences, the external communication antenna 207 is preferably arranged apart from the driving support sensor 204. In this embodiment, the external communication antenna 207 is arranged on the upper side of the headlight unit 201, that is, arranged on the opposite side of the driving support sensor 204 with respect to the headlight unit 201. The external communication antenna 207 may be fixed on the headlight unit 201 using, for example, an adhesive member or a fastening member, and may further be arranged on the upper side. For example, the external communication antenna 207 may be fixed to the support stay 205, or may be fixed to the handle bar together with the operation mechanism 13.

Figure 3A:
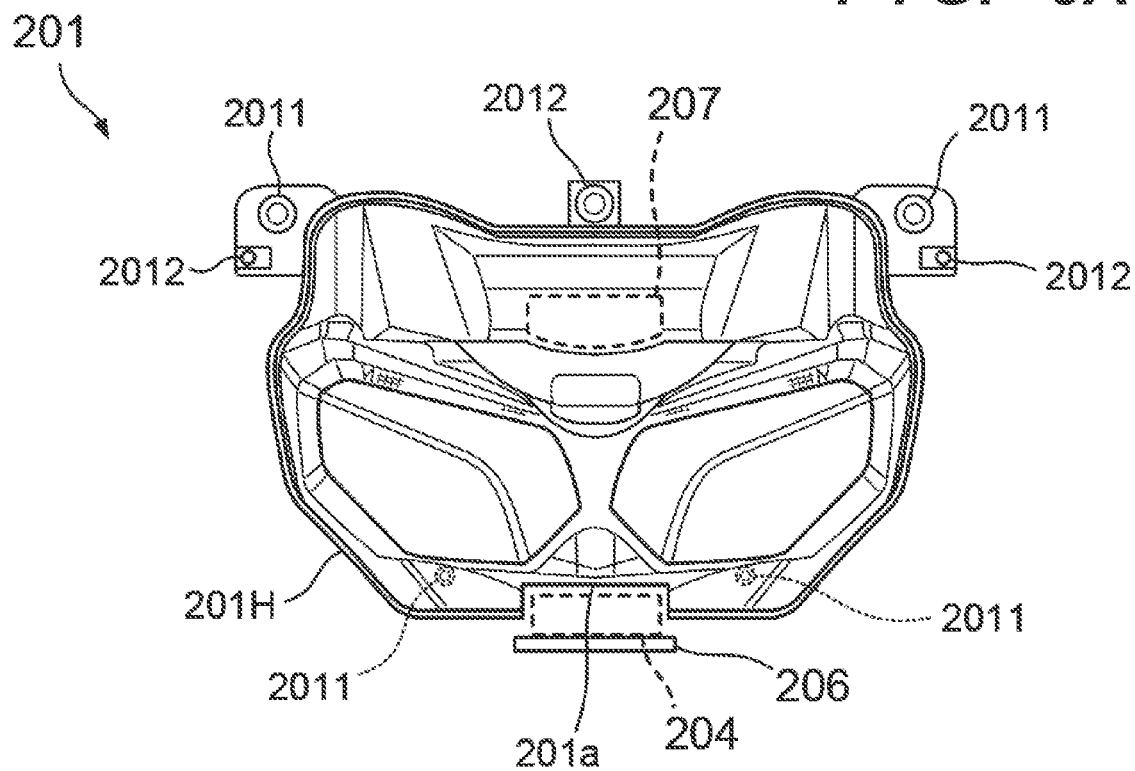
FIG. 3A is a view for explaining an example of the arrangement of a headlight unit.

FIG. 3A is a front view showing an example of the headlight unit 201. In a front view (from the viewpoint in the X direction), a housing 201H of the headlight unit 201 is provided with a depressed portion 201a. The depressed portion 201a is provided in a shape depressed from the lower edge portion of the housing 201H to the upper side. The driving support sensor 204 is preferably fixed to be stored in the depressed portion 201a, and this can, for example, make the driving support sensor 204 unnoticeable and improve the designability.

In addition, the driving support sensor 204 is required to be arranged in a predetermined posture at a position of a predetermined height from the traveling surface such that an appropriate direction range is implemented. Hence, when the driving support sensor 204 is stored in the depressed portion 201a, the driving support sensor 204 can be arranged at a suitable height in the vehicle body 10, and an appropriate direction range can be implemented. The driving support sensor 204 need only be fixed such that at least the upper portion is located in the depressed portion 201a.

Note that a plurality of attachment portions 2011 and 2012 are provided on the peripheral edge of the housing 201H, thereby implementing fixing of the headlight unit 201 and the support stay 205 and fixing of the headlight unit 201 and the upper cowl 202. For example, the headlight unit 201 is fastened to the support stay 205 by the attachment portions 2011, and the upper cowl 202 is fastened to the attachment portions 2012 of the headlight unit 201.

Figure 3B:
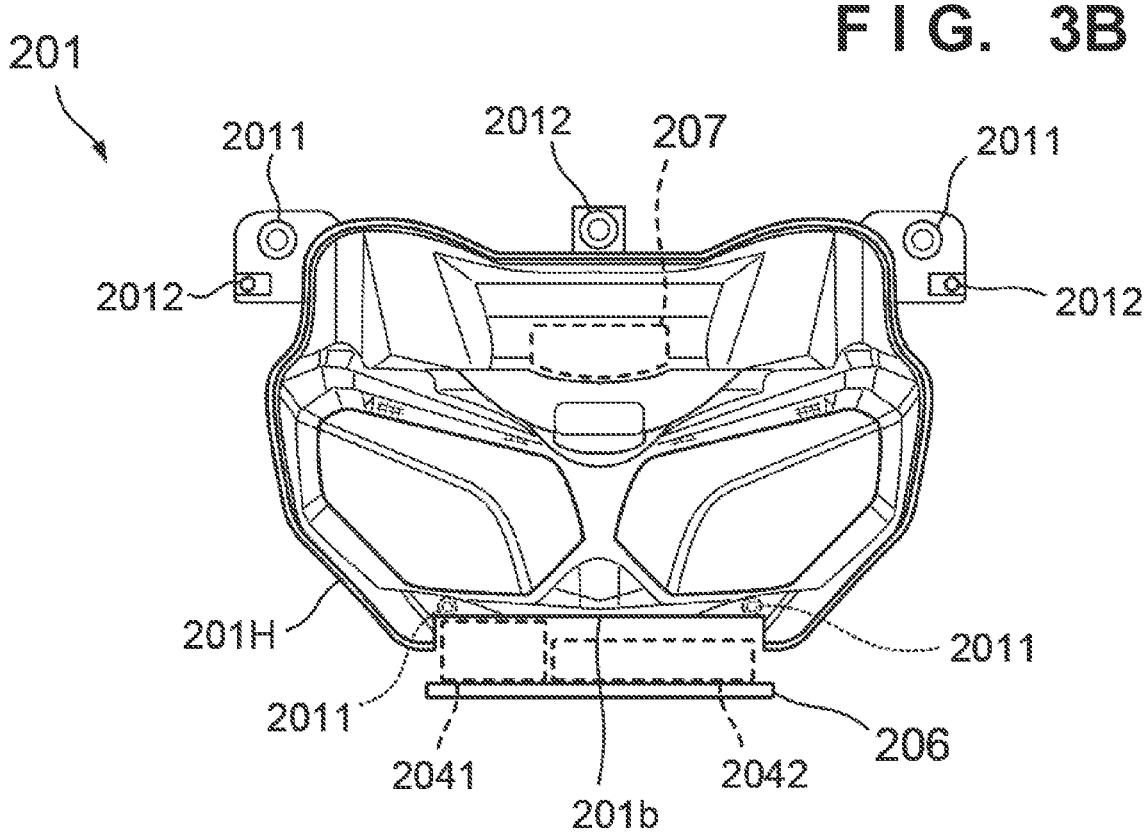
FIG. 3B is a view for explaining another example of the arrangement of the headlight unit.

FIG. 3B is a front view showing another example of the headlight unit 201. If the driving support sensor 204 includes two or more sensors, a depressed portion 201b corresponding to these need only be provided. In this example, a radar 2041 and a camera 2042 are used as the driving support sensor 204. In this example, the radar 2041 and the camera 2042 have thicknesses different from each other, and are fixed with their lower surfaces to the above-described attachment member 206. In this case, one of the radar 2041 and the camera 2042 may be located in the depressed portion 201b.

Figure 4:
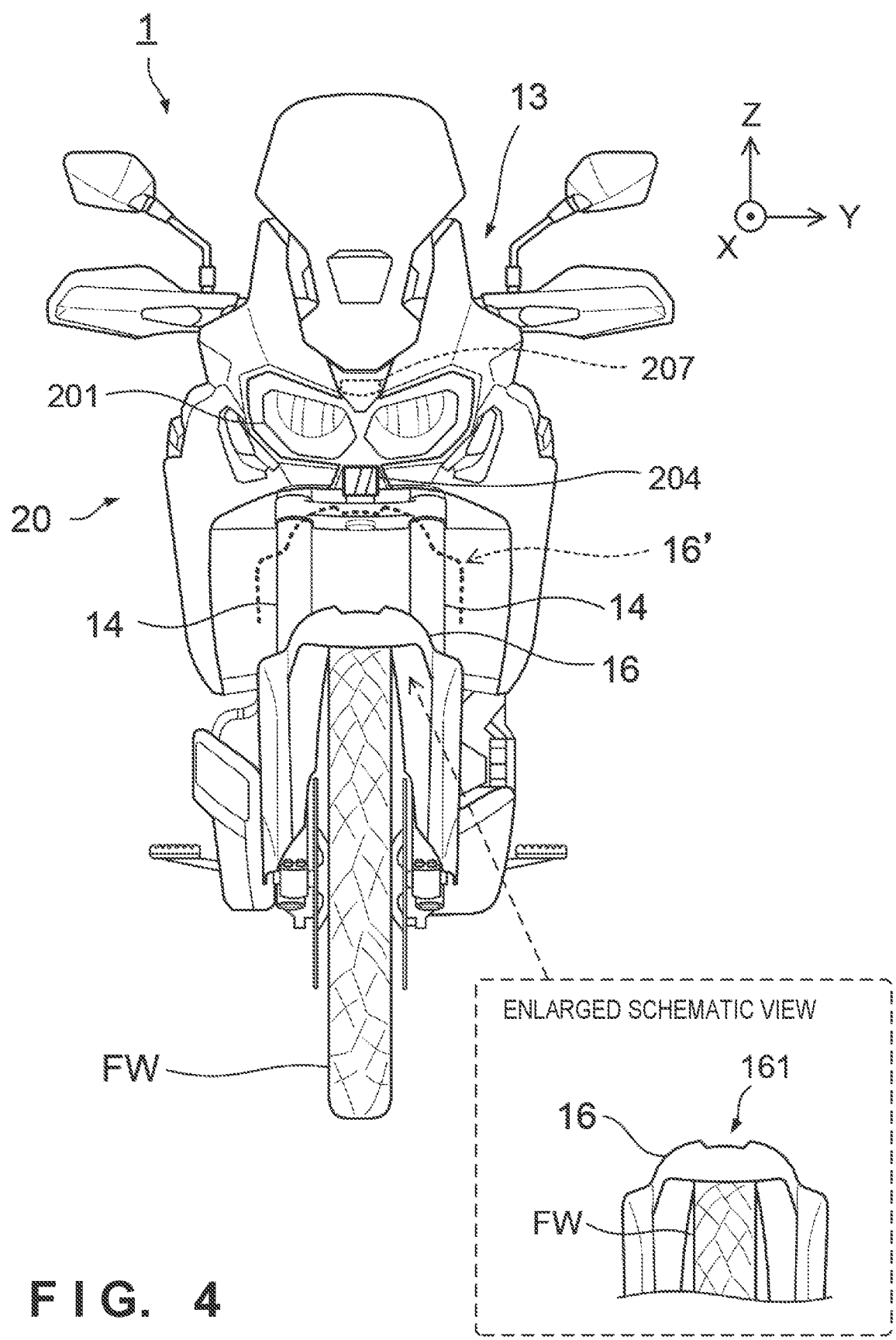
FIG. 4 is a view for explaining an aspect of the straddle type vehicle at the time of step passage.

FIG. 4 is a front view for explaining the vehicle body front structure 20 of the straddle type vehicle 1. As is apparent from FIG. 4, in a front view, the driving support sensor 204 is located between the headlight unit 201 and the front fender 16. Here, as an example, a case in which the front wheel FW makes a vertical motion because the straddle type vehicle 1 passes a step (this may also be expressed as an undulation, unevenness, or the like) of the traveling surface will be examined.

For example, the front fork 14 is provided with a suspension mechanism to enable swing of the front wheel FW according to the extending direction. When the straddle type vehicle 1 passes the step, the front wheel FW can rise, for example, up to a position 16' indicated by a broken line in FIG. 4. The position 16' is the uppermost position to which the front fender 16 can move, that is, a position in a so-called full bump state.

FIG. 4 also shows an enlarged schematic view of the front fender 16. A concave portion 161 is provided in the upper surface of the front fender 16 such that a part located under the driving support sensor 204 has a partially depressed shape. In the front attitude of the front wheel FW and the front fender 16 (an attitude in which the straddle type vehicle 1 can advance straight), the concave portion 161 is formed in the upper surface of the front fender 16 into a groove shape in the front-and-rear direction of the vehicle body, and at least a part of the groove-shaped concave portion 161 is preferably located immediately under the driving support sensor 204.

According to the above-described shape of the front fender 16, the distance between the driving support sensor 204 and the front fender 16 can be ensured. Hence, if the front wheel FW makes a vertical motion as the straddle type vehicle 1 passes a step, and the front fender 16 rises up to the position 16', the interference between the front fender 16 and the driving support sensor 204 can be prevented.

Additionally, as described above (see FIG. 3A and the like), in this embodiment, the driving support sensor 204 is fixed such that at least the upper portion is stored in the depressed portion 201a of the housing 201H of the headlight unit 201. Hence, since the distance between the driving support sensor 204 and the front fender 16 is further ensured, this is also advantageous in preventing the interference.

As described above, according to this embodiment, the driving support sensor 204 is fixed with respect to the support stay 205 on the lower side of the headlight unit 201. The support stay 205 is fixed to the vehicle body frame 12 to support a predetermined vehicle constituent component (the upper cowl 202 in this embodiment) on the front side of the vehicle body frame 12. According to this fixing aspect, the driving support sensor 204 can appropriately be arranged in the straddle type vehicle 1. In addition, since the driving support sensor 204 is arranged on the lower side of the headlight unit 201, the irradiation range of the headlight unit 201 is not narrowed.

Additionally, in this embodiment, the support stay 205 that supports the driving support sensor 204 is fixed not to, for example, the steering stem 203 but to the head pipe 121. Hence, the direction range of the driving support sensor 204 is directed to the front side of the vehicle (+X direction) regardless of the steering operation (regardless of the direction of the handle bar). Hence, according to this embodiment, for example, it is possible to appropriately acquire the traveling environment on the front side of the vehicle by the driving support sensor 204 without any substantial influence of a vibration during traveling of the straddle type vehicle 1, fine adjustment of steering, and the like.

Several preferred embodiments have been direction above. However, the present invention is not limited to these examples, and a partial change or a combination can be made within the scope of the present invention. In addition, individual terms described in this specification are merely used for the purpose of explaining the present invention, and the present invention is not limited to the strict meanings of the terms, as a matter of course, and can also incorporate their equivalents.

For example, the straddle type vehicle indicates a type that a driver rides while straddling the vehicle body, and the concept includes not only a motorcycle (including a scooter-type vehicle) but also a three-wheeled vehicle (a vehicle with one front wheel and two rear wheels or a vehicle with two front wheels and one rear wheel), an all terrain vehicle (ATV) such as a four-wheeled buggy, and the like.

The features of the above-described embodiment will be summarized below.

The first aspect is related to a straddle type vehicle (for example, 1), and the straddle type vehicle is a straddle type vehicle comprising a vehicle body frame (for example, 12) including a head pipe (for example, 121) and a main frame (for example, 122) extending from the head pipe to a rear side, and a headlight unit (for example, 201) provided on a front side of the vehicle body frame, further comprising a support stay (for example, 205) fixed to the vehicle body frame to support a predetermined vehicle constituent component (for example, 202 and the like) on the front side of the vehicle body frame, and a driving support sensor (for example, 204) fixed to the support stay on a lower side of the headlight unit.

In general, the degree of freedom of layout is relatively low in the structure of the straddle type vehicle and, particularly, in the vehicle body front structure. According to the first aspect, it is possible to appropriately arrange the driving support sensor in the straddle type vehicle. Additionally, in general, to obtain an appropriate direction range of the driving support sensor, the driving support sensor is required to be arranged at a position of a predetermined height from a traveling surface. According to the first aspect, this can be satisfied without narrowing the irradiation range of the headlight unit.

In the second aspect, one end portion (for example, 2052) of the support stay is extended from the head pipe to the front side of a vehicle body, and the driving support sensor is fixed to the one end portion.

Since the one end portion of the support stay is extended to the front side of the vehicle body, according to the second aspect, the driving support sensor can be arranged on a relatively front side of the vehicle body.

In the third aspect, the support stay supports the headlight unit.

According to the third aspect, in the arrangement in which the support stay supports the headlight unit, the driving support sensor can appropriately be fixed to the stay.

In the fourth aspect, the straddle type vehicle further comprises an upper cowl (for example, 202) as a part of an exterior panel of the vehicle body, wherein the upper cowl is attached to the headlight unit.

According to the fourth aspect, the headlight unit and the upper cowl are directly attached, and improvement of attachability and improvement of designability are possible.

In the fifth aspect, in a front view, a depressed portion (for example, 201a, 201b) that is depressed to an upper side is provided on a lower edge portion of a housing (for example, 201H) of the headlight unit, and the driving support sensor is fixed such that at least an upper portion is stored in the depressed portion.

According to the fifth aspect, the driving support sensor can be arranged on a relatively upper side of the vehicle body. This makes it possible to ensure the distance between the driving support sensor and the front fender and prevent interference between the front fender and the driving support sensor when, for example, the front wheel makes a vertical motion because of a step on the traveling surface. In addition, since the driving support sensor is unnoticeable, designability can be improved.

In the sixth aspect, the straddle type vehicle further comprises a front wheel (for example, FW) fixed, on a lower side of the driving support sensor, from the head pipe via a front fork (for example, 14), and a front fender (for example, 16) arranged between the front wheel and the driving support sensor, wherein the front fender has such a shape that a part of an upper surface located on the lower side of the driving support sensor is depressed.

According to the sixth aspect, it is possible to ensure the distance between the driving support sensor and the front fender and prevent interference between the front fender and the driving support sensor when, for example, the front wheel makes a vertical motion because of a step on the traveling surface.

In the seventh aspect, the straddle type vehicle further comprises an external communication antenna (for example, 207) arranged on an upper side of the headlight unit.

According to the seventh aspect, it is possible to ensure the distance between the external communication antenna and the driving support sensor and prevent electromagnetic interference between these.

The present invention is not limited to the above embodiments and various changes and modifications can be made within the spirit and scope of the present invention. Therefore, to apprise the public of the scope of the present invention, the following claims are made.

The invention claimed is:

1. A straddle type vehicle, comprising:
   a vehicle body frame including a head pipe and a main frame extending from the head pipe to a rear side;
   a headlight unit provided on a front side of the vehicle body frame;
   a support stay fixed to the vehicle body frame to support a predetermined vehicle constituent component on the front side of the vehicle body frame; and
   a driving support sensor configured to monitor a traveling environment on the front side of the vehicle, and fixed via an attachment member different from the headlight unit, the attachment member extending to a lower front side with respect to the support stay on a lower side of the headlight unit, wherein, in a front view,
- a depressed portion that is depressed to an upper side is provided on a lower edge portion of a housing of the headlight unit,
- the driving support sensor is fixed such that at least an upper portion is stored in the depressed portion, and
- the attachment member is extended toward an outer side in a vehicle width direction with respect to the driving support sensor.

2. The straddle type vehicle according to claim 1, wherein one end portion of the support stay is extended from the head pipe to the front side of a vehicle body, and the driving support sensor is fixed to the one end portion.

3. The straddle type vehicle according to claim 1, wherein the support stay supports the headlight unit.

4. The straddle type vehicle according to claim 1, further comprising an upper cowl as a part of an exterior panel of the vehicle body,
wherein the upper cowl is attached to the headlight unit.

5. The straddle type vehicle according to claim 1, further comprising:
- a front wheel fixed, on a lower side of the driving support sensor, from the head pipe via a front fork; and
- a front fender arranged between the front wheel and the driving support sensor,
wherein the front fender has such a shape that a part of an upper surface located on the lower side of the driving support sensor is depressed.

6. The straddle type vehicle according to claim 1, further comprising an external communication antenna arranged on an upper side of the headlight unit.

* * * * *